Sept. 7, 1943.                A. G. BADE                 2,328,536
                       VARIABLE SPEED TRANSMISSION
                         Filed Sept. 15, 1941           2 Sheets-Sheet 2
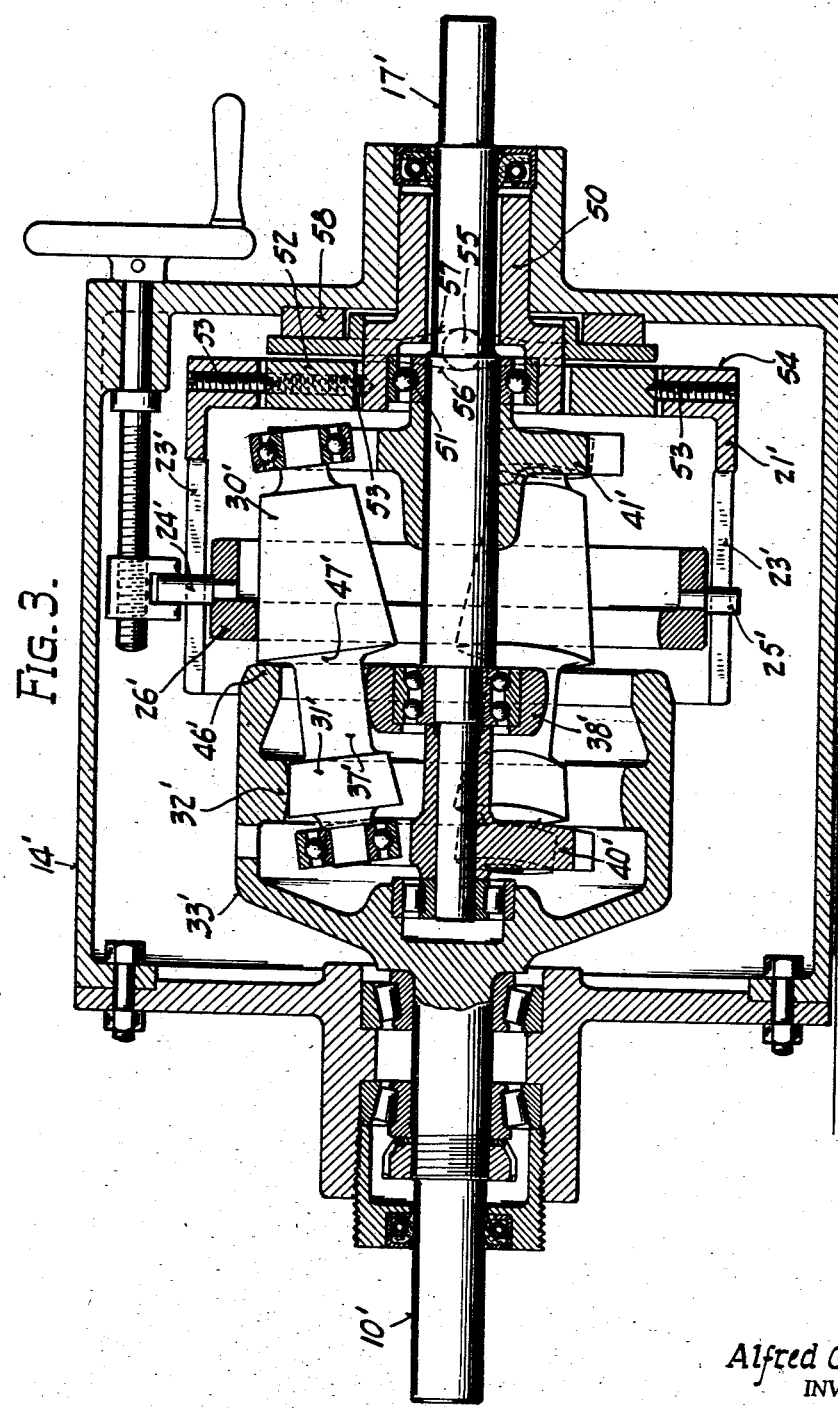
Alfred G. Bade
   INVENTOR.
BY
         ATTORNEY.

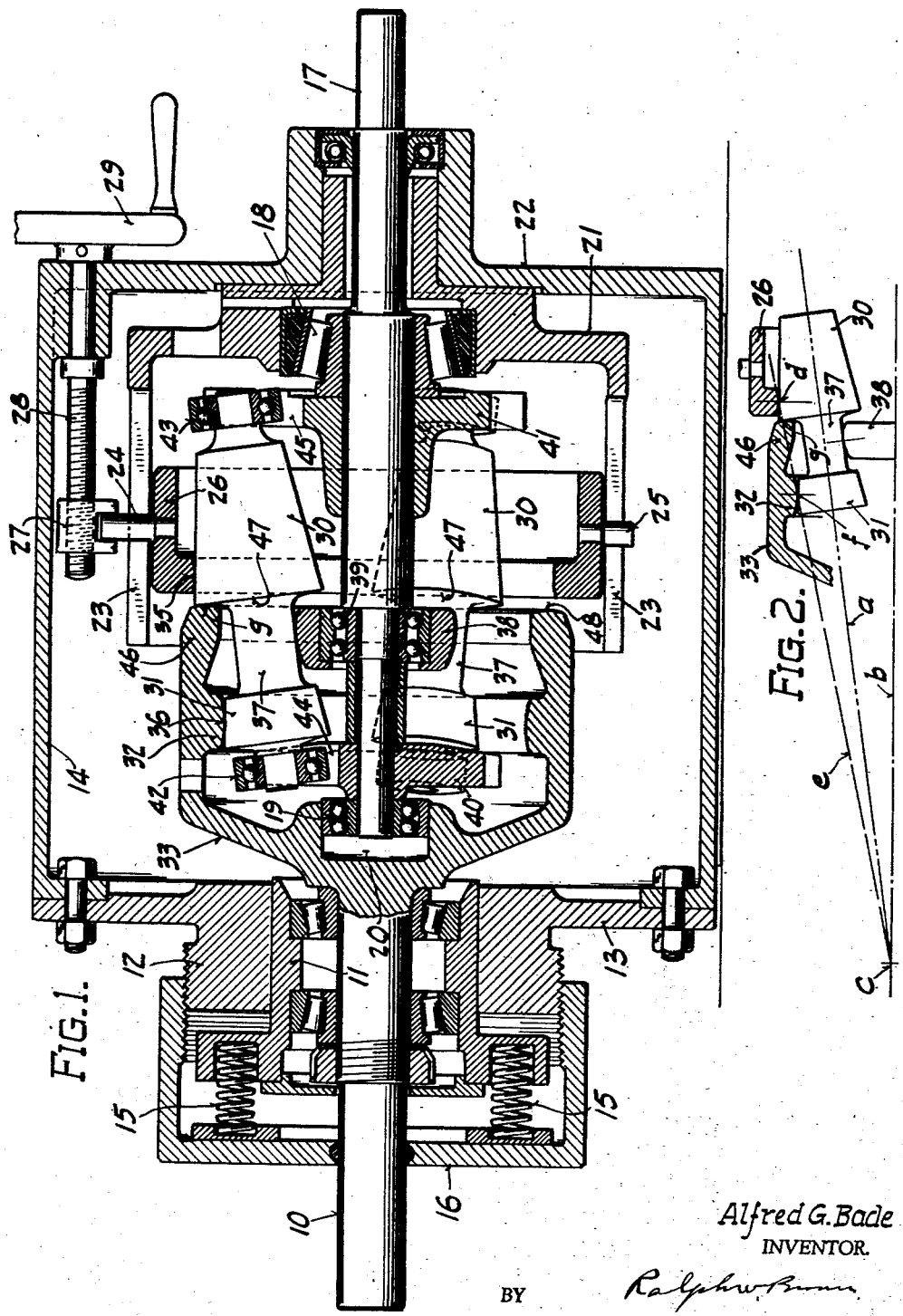

Patented Sept. 7, 1943

2,328,536

UNITED STATES PATENT OFFICE 2,328,536

VARIABLE SPEED TRANSMISSION

Alfred G. Bade, Wauwatosa, Wis., assignor to The Falk Corporation, Milwaukee, Wis., a corporation of Wisconsin Application September 15, 1941, Serial No. 410,872

7 Claims. (Cl. 74—281)

This invention relates to variable speed transmissions of the type disclosed in my copending applications Serial No. 397,711, filed June 12, 1941, and Serial No. 400,726, filed July 2, 1941.

Each of the transmissions therein disclosed involves a plurality of planet rollers supported on a fulcrum and engaged in frictional rolling contact with a driven ring and with a control ring, the latter being adjustable to regulate the speed ratio of the transmission. In those particular devices, development of the required contact pressures between the rollers and the driven and control rings involves a relative axial displacement between the rollers and driven ring, such as to cause an undesirable deviation from the speed ratio normally established by the control ring. Also, in the device disclosed in the latter of the above identified applications, the axial thrust and relative motion between the fulcrum ring and rollers, results in undesirable friction and wear.

One object of the present invention is to provide a variable speed transmission of the type mentioned with the parts so combined and arranged as to avoid the above difficulties.

A more specific object is to provide a variable speed transmission of the type mentioned in which an accurately fixed axial relation is maintained between the rollers and driven ring.

Another object is to provide a variable speed transmission of the type mentioned in which the driven member reacts on the rollers to axially position the same and in such manner that relative motion at the points of contact between said member and rollers is reduced to a minimum.

Other more specific objects and advantages will appear from the following description of two illustrative embodiments of the present invention.

In the accompanying drawings:

Figure 1 is a vertical longitudinal sectional view of a variable speed transmission constructed in accordance with the present invention.

Fig. 2 is an explanatory diagram.

Fig. 3 is a view similar to Fig. 1 of another variable speed transmission embodying the present invention.

The variable speed transmission shown in Fig. 1 comprises a driven shaft 10 journalled in a cage 11 closely fitted for axial movement in a hub 12 carried by a removable end plate 13 of an appropriate housing 14. A plurality of springs 15, interposed between the outer end of the cage 11 and a cup-shaped nut 16 threaded on the hub 12, urge the cage 11 and driven shaft 10 toward the interior of the housing.

An axially movable drive shaft 17 is aligned with the driven shaft 10, the outer end of the drive shaft being supported on a radially yieldable bearing 18 and the inner end being supported in a bearing 19 seated in a socket 20 provided in the inner end of the driven shaft 10 and permitting free axial movement of the driven shaft relative to the drive shaft.

A stationary cylindrical structure 21, disposed coaxially of and surrounding the drive shaft 17, is fixed to the end wall 22 of the housing. This structure is longitudinally slotted as at 23 to receive a pair of diametrically disposed pins 24 and 25 which project radially from a control ring 26 to hold the ring against rotating. The ring 26 is movable lengthwise of the slots 23 and is shifted and controlled by appropriate means, such as a non-rotating nut 27 forked to receive the pin 24 and mounted upon a screw rod 28 by which it is actuated and controlled. The rod 28 is shown journalled in the end wall 22 of the housing and is equipped with an appropriate handle 29 by which it may be rotated.

The construction and arrangement of the parts thus far mentioned are substantially the same as in the latter of the two applications hereinabove identified, so that a further detailed description thereof is not deemed necessary.

The control ring 26 encircles and contacts the tapered sections 30 of a plurality, preferably three, planet rollers arranged to revolve in one direction about the drive shaft 17 and in an opposite direction about their individual axes so that the sections 30 make rolling contact with the ring 26. Each planet roller is also provided with a second tapered section 31 in rolling engagement with an encircling driven ring 32 formed within a drum 33 carried by the driven shaft 10. The contact faces 35 and 36 of the control ring 26 and driven ring 32 are preferably somewhat crowned so as to reduce the area of contact thereof with the rollers. The two sections 30 and 31 of each roller are connected by a reduced substantially cylindrical portion 37 in rolling and rockable engagement with the crowned face of a ring 38 which provides a fulcrum support therefor. The ring 38 is supported from the drive shaft 17 through a bearing 39 so as to permit free rotation of the ring 38 relative to the drive shaft.

In this instance the two sections 30 and 31 of each roller are substantially conical, each being tapered in the same direction and to the same degree, and each roller is inclined at an angle equal to the angle of the taper and in such direction that the outer extremities of both sections 30 and 31 extend substantially parallel to the axis of the drive shaft 17.

As in the latter of the two applications above identified, the planet rollers are driven from the drive shaft 17 through two spiders 40 and 41 fixed to the drive shaft, each roller having bearings 42 and 43 at its opposite ends fitted in radial guide slots 44 and 45, respectively, formed in the spiders, the slots 44 and 45 and coacting bearings 42 and 43 serving also to retain the axis of each roller within a radial plane of the drive shaft. The fulcrum ring 38, control ring 26, and the driven ring 32 coact with the rollers to maintain them in the inclined positions above described, so that the axis of rotation $a$ of each intersects the axis of rotation $b$ of the drive shaft 17 at a fixed point $c$, as indicated in Fig. 2.

The arrangement is such that when the control ring 26 contacts each of the roller sections 30 at point $d$, the rollers revolve idly within the control and driven rings 26 and 32 without imparting rotation to the latter. This necessarily follows, since point $d$ is the point at which the line $e$, extending from the fixed point $c$ through the point of contact $f$ of the roller sections 31 with the ring 30, intersects the surface of the roller section 30, (see Fig. 2) so that there can be no relative rotation between the ring 30 and non-rotating ring 26. But when the control ring 26 is shifted along the roller section 30 away from the point $d$, the planetary motion of the rollers is thereby so changed as to cause the driven ring 32 to rotate at a rate dependent upon the extent of movement of the control ring.

In the transmission shown in Fig. 1, the required contact pressures between the roller sections 30 and 31 and the rings 32 and 26, respectively, are effected by forcing the several rollers lengthwise along their upwardly inclined axes, the fulcrum ring 38 reacting against the inclined sections 37 of the rollers to force them outwardly against the rings 30 and 31. In this instance the thrust of the springs 15 transmitted through the axially movable driven shaft 10 is utilized for that purpose, the drum 33 being extended to provide an end ring 46 which bears against the end faces 47 of the roller sections 30. The contact face 47 of the end ring 46 is preferably crowned and the end faces 47 of the roller sections 30 slope outwardly toward the sections 37, so as to reduce to a minimum the areas of the contact therebetween. The point of contact between the end ring 46 and each end face 47 is at the point $g$ on the line $e$ of Fig. 2. Since there is no appreciable relative motion between each roller section 30 and the end ring 46 at the contact point $g$, the contacts at those points serve to transmit the thrust of the springs 15 to the several rollers without appreciable friction or wear.

The variable speed transmission shown in Fig. 3 is similar in many respects to that of Fig. 1 except that the driven shaft 10' and the drum 33' carried thereby are axially fixed with respect to the housing 14', while the drive shaft 17' and fulcrum ring 38' carried thereby are axially movable, provision being made for forcing the roller sections 30' and 31' into pressure contact with the control and driven rings 26' and 32' by the reaction of the axially movable fulcrum ring 38' against the inclined sections 37' of the rollers. In this instance the fulcrum ring 38' is urged against the rollers by an axial thrust imposed upon the drive shaft 17' through mechanism energized by the torque load on the control ring 26'.

The mechanism shown for this purpose is quite similar to that employed for a similar purpose in the application first above mentioned. It includes an axially movable rotatable cage 50 carrying a thrust transmitting bearing 51 in which the drive shaft 17' is journalled. A thrust ring 52 is rockably attached to the inner end of the cage 50 through a pair of diametrically aligned pivot screws, one of which is shown at 53, which project inwardly from the ring 52 into suitable sockets in the cage. The thrust ring 52 provides support for a cylindrical structure 21' which is rockably attached thereto through a pair of diametrically aligned pivot screws 53 which project inwardly from the end 54 of the structure 21' into appropriate sockets in the thrust ring 52.

The cylindrical structure 21' is slotted, as at 23', to receive the radially projecting pins 24' and 25', carried by the control ring 26', as in the Fig. 1 device hereinabove described, so that the torque load on the ring 26' tends to rotate the structure 21' and the thrust ring 52 and cage 50 connected therewith. Such rotation is resisted by a pair of balls 55 arranged at opposite sides of the cage 50 and interposed between cam surfaces 56 and 57 formed on the opposed faces of the thrust ring 52 and a cam ring 58 fixed to the end wall 22' of the housing, all in the manner fully explained in the application hereinabove first named.

The arrangement is such that the torque load on the control ring 26' is sustained by the reaction of the balls 55 against the opposed cam surfaces 56 and 57, and this reaction induces an axial thrust upon the ring 52 which is transmitted to and through the cage 50 and shaft 17' to force the fulcrum ring 38' against the inclined section 37' of the rollers. The roller sections 30' and 31' are thus forced outwardly into pressure contact with the control and driven rings 26' and 32', respectively.

It will of course be understood that the end ring 46' of the extended drum 33' bears against the end faces 47' of the roller sections 30', in the same manner as hereinabove explained, and being thus engaged the ring 46' positively holds the rollers against axial displacement without inducing any appreciable friction or wear at the points of contact therewith. It will also be understood that the several planet rollers are driven from the drive shaft 17' through the spiders 40' and 41', exactly as in the device of Fig. 1, and that the speed ratio of the transmission is regulated by shifting the control ring 26' along the rollers in the manner and by mechanism hereinabove explained.

Various changes may be made in either embodiment of the invention hereinabove specifically described without departing from or sacrificing the advantages of the invention as defined in the appended claims.

I claim:

1. In a variable speed transmission the combination of two torque sustaining rings one rotatable relative to the other, a roller having a tapered section in frictional rolling contact with one of said rings and another section in frictional rolling contact with the other of said rings, a fulcrum for said roller cooperating therewith and with said rings to provide a three-point support for said roller, and means for moving said fulcrum relative to said roller in a direction lengthwise of said roller to thereby develop contact pressures between said roller sections and rings.

2. In a variable speed transmission the combination of two torque sustaining rings one rotatable relative to the other, a roller having a tapered section in frictional rolling contact with one of said rings and another section in frictional rolling contact with the other of said rings, a fulcrum for said roller cooperating therewith and with said rings to provide a three-point support for said roller, and torque responsive means for effecting relative movement between said roller and fulcrum one relative to the other in a direction lengthwise of said roller to thereby develop contact pressures between said roller sections and rings.

3. In a variable speed transmission the combination of two torque sustaining rings one rotatable relative to the other, a roller having a tapered section in frictional rolling contact with one of said rings and another section in frictional rolling contact with the other of said rings, a fulcrum for said roller cooperating therewith and with said rings to provide a three-point support for said roller, and resilient means for effecting relative movement between said roller and fulcrum one relative to the other in the direction lengthwise of said roller to thereby develop pressure contact between said roller sections and rings.

4. In a variable speed transmission the combination of two concentric torque sustaining rings one rotatable relative to the other, a roller having a conical section in frictional rolling contact with one of said rings and another conical section in frictional rolling contact with the other of said rings, said conical sections being tapered in the same direction, and a fulcrum for said roller cooperating therewith and with said rings to provide a three-point support for said roller.

5. In a variable speed transmission the combination of two concentric torque sustaining rings one rotatable relative to the other, a roller having a conical section in frictional rolling contact with one of said rings and another section in frictional rolling contact with the other of said rings, the said conical section having an annular end face, one of said rings being movable along said conical section to vary the speed ratio of the transmission, and means on the other of said rings engaging said end face to determine the lengthwise position of said roller.

6. In a variable speed transmission the combination of two concentric rings one rotatable relative to the other, a plurality of planet rollers inclined relative to and revolvable about the axis of said rings, each of said rollers having a tapered section in frictional rolling engagement with one of said rings and another section in frictional rolling engagement with the other of said rings, the said tapered section of each roller having an annular end face, means for moving one of said rings along the said tapered sections of said rollers to regulate the speed ratio of the transmission, and means on the other of said rings engaged with the said end faces of said tapered sections to determine the lengthwise positions of said rollers.

7. In a variable speed transmission the combination of a non-rotating ring, and a rotor coaxial therewith, a plurality of planet rollers inclined relative to and revolvable about the axis of said rings, the axes of said rollers intersecting the axis of said rings at a common point, each of said rollers having a conical section in frictional rolling engagement with said non-rotating ring and another section in frictional rolling contact with said rotor, each of said conical sections having an annular end face, said non-rotating ring being movable along said conical sections to regulate the speed ratio of the transmission, and a ring on said rotor contacting the said end faces of said roller sections to determine the lengthwise positions of said rollers, the point of contact of each end face with said ring being on a line passing through the point of intersection of said roller and ring axes and through the point of contact of said rotor with the roller.

ALFRED G. BADE.